US007577550B2

(12) United States Patent
Ozonat et al.

(10) Patent No.: US 7,577,550 B2
(45) Date of Patent: Aug. 18, 2009

(54) SYSTEM AND METHOD FOR DETECTING PERFORMANCE ANOMALIES IN A COMPUTING SYSTEM

(75) Inventors: Mehmet Kivanc Ozonat, Fort Collins, CO (US); Ira Cohen, Fort Collins, CO (US); Julie A. Symons, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 138 days.

(21) Appl. No.: 11/742,534

(22) Filed: Apr. 30, 2007

(65) Prior Publication Data

US 2008/0270077 A1 Oct. 30, 2008

(51) Int. Cl.
*G06F 11/30* (2006.01)
*G21C 17/00* (2006.01)

(52) U.S. Cl. .................. 702/186; 702/105; 702/183; 714/25; 714/48; 700/29; 700/79; 700/110; 713/188; 713/194; 706/52

(58) Field of Classification Search ............... 702/105, 702/183, 184, 186; 714/25, 48; 713/188, 713/194, 201; 700/29, 79, 110; 706/52

See application file for complete search history.

(56) References Cited

U.S. PATENT DOCUMENTS

| 6,769,066 | B1* | 7/2004 | Botros et al. ............... 726/23 |
| 6,915,237 | B2* | 7/2005 | Hashemian ................ 702/183 |
| 7,225,343 | B1* | 5/2007 | Honig et al. ............... 713/194 |
| 2007/0150949 | A1* | 6/2007 | Futamura et al. ............. 726/22 |

OTHER PUBLICATIONS

Zhang et al., 'A Hierarchical Anomaly Network Intrusion Detection System using Neural Network Classification', Jun. 2001, IEEE, p. 85-90.*

* cited by examiner

*Primary Examiner*—Edward Raymond
*Assistant Examiner*—Elias Desta (57) ABSTRACT

A method comprises receiving, by learning logic, historical metrics of a computing system being monitored. The learning logic determines, from the received historical metrics, forms of sub-functions that are included in an equation, wherein each sub-function represents a dependency between two components linked in a hierarchical structure representing the computing system being monitored. State determination logic receives metric values of the computing system being monitored, and determines states that minimize the equation composed of the sub-functions over the received metric values. Finally, anomalous behavior of the computing system may be detected based on the determined states.

20 Claims, 5 Drawing Sheets

EXAMPLE OF HIERARCHICAL STRUCTURE OF A SERVICE

METRICS STATE · URL's STATE · DATA CENTERS STATE · OVERALL SERVICE STATE

FIG. 6

SYSTEM AND METHOD FOR DETECTING PERFORMANCE ANOMALIES IN A COMPUTING SYSTEM

TECHNICAL FIELD

The following description relates generally to detecting performance anomalies in a computing system, and more particularly to systems and methods for evaluating a computing system and determining functions for use in determining states of components of the system.

DESCRIPTION OF RELATED ART

Today, computer systems are heavily relied upon for performing many tasks, including as examples delivering (e.g., via computer networks, such as the Internet) a large array of business, government, and personal services. Mission critical operations, related to scientific instrumentation, military operations, and health services, as examples, are making increasing use of computer systems and computer networks for delivering information and distributed coordination. Many users commonly access service providers' computer systems via a communication network (e.g., the Internet) seeking information and/or such services as personal shopping, airline reservations, rental car reservations, hotel reservations, on-line auctions, on-line banking, stock market trading, as well as many other services being offered by service providers via computer networks, such as the Internet. Computing systems are also relied upon for controlling various operations, such as manufacturing of goods, inventory control, security monitoring control, etc. Because of the heavy reliance on such computing systems, a desire often exists for monitoring the computing systems to detect anomalous behavior thereof. That is, a desire often arises for monitoring of computing systems to detect occurrences of performance problems so that appropriate action can be taken to address the problems.

One example of a computing system that is commonly implemented today is a distributed computing system. In general, a distributed computing system is a type of computing system in which different components and objects comprising an application can be located on different computing resources (e.g., on different computers) that are communicatively coupled together (e.g., via a communication network). So, for example, a distributed word processing application might be implemented with an editor component thereof on one computer, a spell-checker object thereof on a second computer, and a thesaurus component thereof on a third computer. In some distributed computing systems, each of the three computers could even be running a different operating system. Various other computing systems exist, including stand-alone computing systems, and other networked computing systems across which applications may or may not be distributed.

If a problem (e.g., an error, slow-down, failure, etc.) occurs in a computing system, such as within one or more computers in a distributed computing system or in the communication network, the problem is likely to be reflected as abnormalities in one or more of various metrics. These metrics include, but are not limited to, performance metrics (e.g., average server time, server time distribution histogram, page file size, number of slow pages, number of transactions, etc.), network metrics (e.g., network throughput, network latency, etc.), and system metrics (e.g., CPU utilization, memory utilization, etc.). Techniques are well-known in the art for monitoring computing systems to accurately compute such metrics. For instance, resource monitors are known that are able to monitor a computing system and provide such performance, network, and/or system metrics.

In turn, performance management monitors may monitor the computed metrics to detect if there is a problem in the computing system, as well as to characterize any such problem. Existing management tools provide the ability for a user (e.g., system administrator) to set thresholds for the metrics, often with the intent that such thresholds are set based on service level agreements and objectives. However, setting such thresholds can be challenging for several reasons. First, in large environments, there may be a very large number of applications and related metrics making it infeasible (or, even impossible) for the IT personnel to set corresponding thresholds for all of those metrics manually. Second, many administrators do not know to what values these thresholds should be set, as there is no clear understanding of the relationship between business objectives and these metrics.

Therefore, a desire exists for automated detection and characterization of the state of computing systems, such as distributed computing systems. The ability to automatically determine and characterize whether a system or an application is in an abnormal state at a given time would provide the opportunity to solve the system and application problems fast and with a small cost.

DETAILED DESCRIPTION

Various embodiments of the present invention are now described with reference to the above figures, wherein like reference numerals represent like parts throughout the several views. Embodiments of the present invention are directed to systems and methods for detecting performance (or "behavioral") anomalies in a computing system. According to embodiments of the present invention, a system administrator is not required to set thresholds for observed metrics of the computing system in order to detect anomalies. Rather, according to certain embodiments, learning logic is provided that is operable to determine, from historical metrics of the system, appropriate state determination functions for various components of the system. State determination logic is also provided, which employs the state determination functions to, based on observed metrics of the computing system, determine states of the various system components. A state of a given component may be indicative of whether the behavior of the given component is normal or abnormal. According to certain embodiments, the computing system is modeled with a hierarchical model, and corresponding states of components of each layer of the model are determined. As an example, embodiments of the present invention may be employed for monitoring a distributed application that resides on a computing system, wherein the distributed application is modeled hierarchically and states of the components of the distributed application are determined (e.g., based on observed metrics of the computing system and interdependencies reflected in the hierarchical model) that are indicative of whether the distributed application is behaving normally.

According to one embodiment, a base layer of the hierarchical model comprises observed metrics for the computing system (i.e., components for which metrics are observed), and each successive layer of the hierarchy includes components of the system that are dependent on the preceding layer, up to the top (or "apex") layer that is representative of the full system (or portion thereof, e.g., a given distributed application) that is being monitored. Such hierarchical model may be employed by learning logic and by state determination logic, as discussed further herein.

According to one embodiment, learning logic is provided that is operable to select sub-functions, d and h, of a given equation such that the description length represented by the given equation (e.g., Equation 1 described further below) is minimized over a set of historical metric values observed for the system. In general, sub-function $d_i$ is a cost function associated with a component i in a base layer of the hierarchical model of the computing, and sub-function $h_{k,i}$ refers to a function associated with each component of each intermediate layer k of hierarchy where such function is based on the state of the component i and the state of the component to which component i is connected in the successive layer k+1 of the hierarchical model. State determination logic is also provided that is operable to select the arguments of sub-functions h and d (where the arguments are the states) that will minimize the description length represented by a given equation (e.g., Equation 1 discussed below) for the current metric values observed for the system being monitored.

In general terms, the principle of minimum description length (MDL) is a theory that has its roots in information theory. According to the MDL principle, the best decision is the one that leads to the shortest description of the data, where the description length of the data is measured in terms of the information-theoretic entropy. The description length of a distributed service is the sum of the description length of the metrics and the description length of the states of the components. The metrics are observed/collected, and embodiments of the present invention may be employed to find the states. From the MDL principle, the best set of states is the one that minimizes the description length Thus, according to certain embodiments of the present invention, the learning logic finds the sub-functions that minimize the description length represented by a given equation over the historical metric data observed for a computing system (ensuring that an alarm ratio criterion is met, as discussed further herein). The state determination logic finds the particular set of states that will minimize the description length for the current metric values observed for the system being monitored. According to certain embodiments, both the learning logic and state determination logic make use of the hierarchical structure of the service mentioned above.

Further, it should be understood that while minimization of description length is employed herein as an illustrative example, the function used for minimization does not have to be the description length. Rather, in alternative embodiments, any function having sub-functions may be employed, where each sub-function represents the dependency between two of the components linked in the hierarchical structure. The learning logic may be implemented to find the exact forms of these sub-functions, and the state determination logic may be implemented to find the states that minimize the function composed of these sub-functions over the current metric values.

Figure 1:
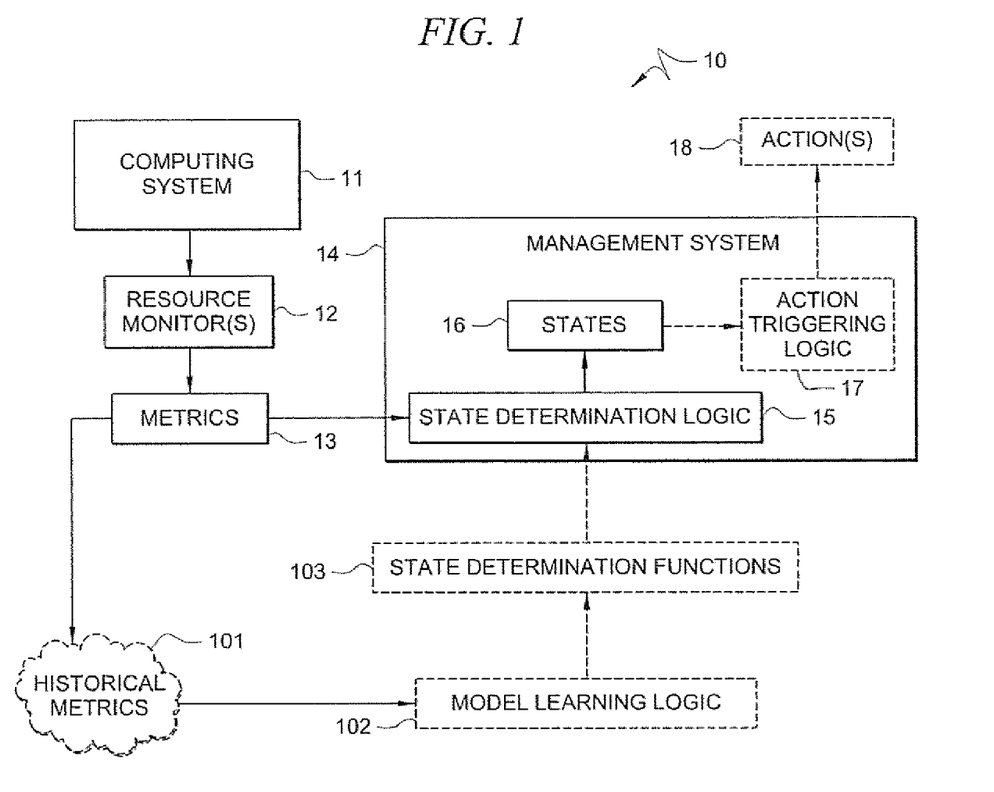
FIG. 1 shows an exemplary system according to one embodiment of the present invention.

FIG. 1 shows an exemplary system 10 according to one embodiment of the present invention. System 10 comprises a computing system 11, which may be any computing system for which performance management is desired (e.g., to detect anomalous behavior, etc.), including as an example a personal computer (PC), laptop computer, server computer, etc., or even a distributing computing system (e.g., computing system 11 may comprise a plurality of computing resources across which applications (or portions thereof) may be distributed). Resource monitor(s) 12 are operable to monitor computing system 11 to derive metrics 11 for such computing system 11. Metrics 13 may include such metrics as performance metrics (e.g., average server time, server time distribution histogram, page file size, number of slow pages, number of transactions, etc.), network metrics (e.g., network throughput, network latency, etc.), and system metrics (e.g., CPU utilization, memory utilization, etc.), as examples. Any technique now known or later developed for determining such metrics 13 may be employed by resource monitors 12.

Management system 14 is also provided, which is operable to receive metrics 13 and evaluate such metrics 13 to detect anomalous behavior of computing system 11. As shown, management system 14 comprises state determination logic 15, in this embodiment, which is operable to receive metrics 13 and, from such metrics 13, determine one or more "states" 16 of the computing system 11 (or component parts thereof such as a given application executing thereon). For instance, states 16 may indicate one of a plurality of different states pertaining to functionality of computing system 11 (or some component part thereof). A corresponding state 16 may be determined for each of various different component parts of computing system 11. As an example, states 16 may be either "0" indicating a normal state for a corresponding component part of computing system 11 or "1" indicating an abnormal state for a corresponding component part of computing system 11. As described further herein, in certain embodiments, the component parts of computing system 11 are arranged into a hierarchy of different layers by management system 14, which aids management system 14 in efficiently determining the state of the different components based, for example, on their interdependencies.

According to certain embodiments, management system 14 may comprise certain action triggering logic 17 that is operable to monitor states 16 and trigger appropriate actions 18 based on the monitored states 16. For example, in response to a state 16 indicating that a component of computing system 11 is in an abnormal state, action triggering logic 17 may trigger a corresponding action 18 (e.g., based on rules that may have been predefined by a system administrator), such as triggering an alarm (e.g., an audible alarm and/or visual alarm to a display of an administrator's console), triggering a notification of appropriate personnel (e.g., call, email, text-message, fax, etc. an administrator, service personnel, technician, etc.), shutting down all or a part of computing system 11, re-assigning all or a portion of a workload to a different computing resource (either within computing system 11 or to a different computing system), etc.

According to certain embodiments, metrics 13 that are captured over a period of time are stored as historical metrics 101. Thus, for instance, historical metrics 101 may comprise performance metrics of computing system 11 over some period of time, say the past 6 months. Further, according to certain embodiments of the present invention, model learning logic 102 is provided, which receives such historical metrics 101 and analyzes the behavior of computing system 11 over the period of time for which the historical metrics 101 were captured. From such analysis of historical metrics 101, model learning logic 102 may determine appropriate state determination functions 103 that are to be employed by state determination logic 15.

Various elements of exemplary system 10, such as management system 14, state determination logic 15, action triggering logic 17, and model learning logic 102 may be implemented as computer-executable software code stored to a computer-readable medium and/or as hardware logic, as examples. Also, metrics 13, historical metrics 101, state determination functions 103, and states 16 may comprise corresponding data, which is stored to a computer-readable medium, such as memory, hard drive, peripheral data storage drive, optical data storage (e.g., CD, DVD, etc.), magnetic data storage, tape storage, etc. Such data may be stored in the form of any suitable data structure, such as to a database, file, table, etc.

According to embodiments of the present invention, learning logic 102 is employed for monitoring a computing system 11 over time and based on the system's historical performance (e.g., historical metrics 101), such learning logic 102 determines whether observed metric value(s) 13 (e.g., at a given time) indicates that a given component of the system is normal or abnormal (i.e., a "state" of the component). Thus, a system administrator is not required to estimate threshold values of various metrics that are to be used for detecting anomalies in the system's behavior, but rather the learning logic 102 is operable to determine an appropriate function (e.g., function 103) for determining whether the system's behavior is in a normal or abnormal state based on observed metric values 13.

Figure 2:
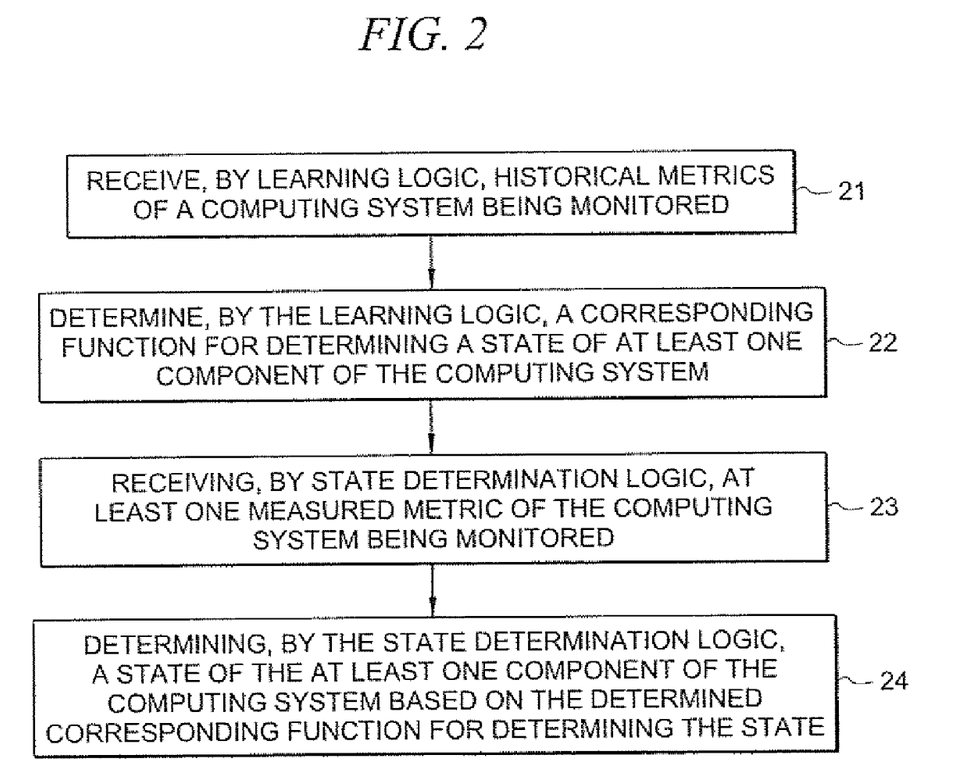
FIG. 2 shows an operational flow diagram of one embodiment of the present invention.

FIG. 2 shows an operational flow diagram according to one embodiment of the present invention. In operational block 21, leaning logic 102 receives historical metrics 101 of a computing system 11 being monitored. In block 22, the learning logic 102 determines a corresponding function 103 for determining a state of at least one component of the computing system 11. As described further herein, such corresponding function for determining the states of the components may be determined in a manner that minimizes a given overall function of the system. In block 23, state determination logic 15 receives at least one measured metric 13 of the computing system 11 being monitored. In operational block 24, the state determination logic 15 determines a state 16 of the at least one component of the computing system 11 based on the determined corresponding function 103 for determining the state.

Thus, in certain embodiments, the learning logic 102 may be utilized periodically (e.g., nightly, weekly, etc.) to evaluate historical metrics 101 of system 11 and update the state determination functions 103 that are employed by state determination logic 15. State determination logic 15 may then monitor real-time metrics 13 captured for system 11 and utilize the state determination functions 103 to detect anomalies in the behavior of system 11 based on the received metrics 13.

According to one embodiment, a computing system being monitored is modeled hierarchically, which may provide efficiencies learning the state determination functions 103 (by learning logic 102) and/or for state determination (by state determination logic 15). For instance, a hierarchical model of the system may be employed that corresponds to the interdependencies of various components of the system and/or the underlying metrics observed for the system. As discussed further herein, in one embodiment, a base layer of the hierarchy includes the observed metrics, and each successive layer of the hierarchy includes components of the system being monitored that are dependent on the preceding layer, up to the top (or "apex") layer that is representative of the full system (or portion thereof, e.g., a given distributed application) that is being monitored.

Figure 3:
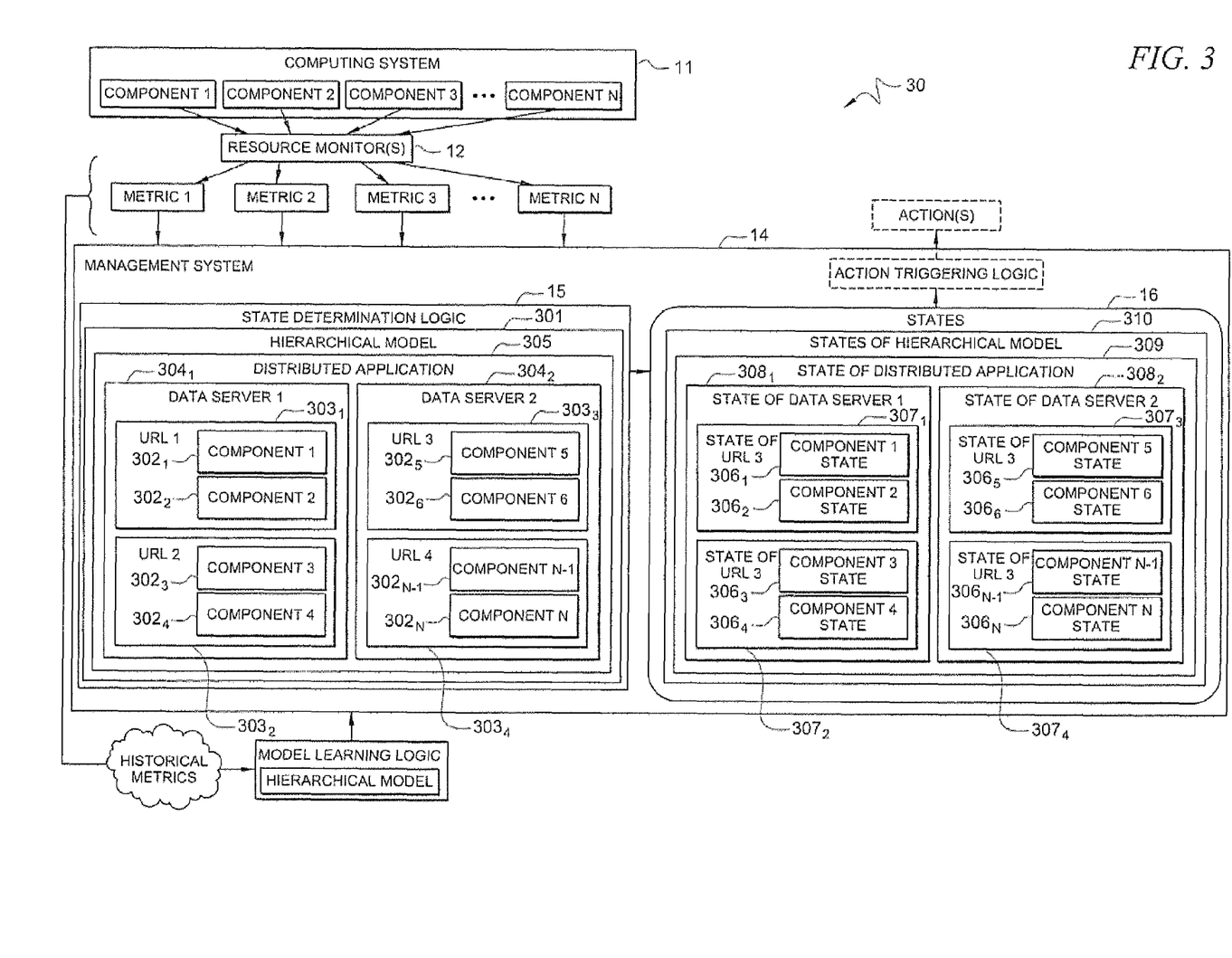
FIG. 3 shows another exemplary system according to an embodiment of the present invention.

Turning to FIG. 3, an exemplary embodiment in which the management system employs such a hierarchical model is shown. As shown, an hierarchical model 301 is employed in learning logic 102 and in state determination logic 15, wherein such exemplary hierarchical model 301 is shown in greater detail in state determination logic 15. FIG. 3 shows exemplary system 30 that again comprises computing system 11, which may be any computing system for which performance management is desired (e.g., to detect anomalous behavior, etc.). In this example, computing system 11 is a system on which a distributed application executes. In this example, computing system 11 comprises various components, Component 1, Component 2, . . . , Component N, for which resource monitor(s) 12 are operable to capture metrics, such as Metric 1, Metric 2, . . . , Metric N, respectively. Metrics 1-N may include such metrics as performance metrics (e.g., average server time, server time distribution histogram, page file size, number of slow pages, number of transactions, etc.), network metrics (e.g., network throughput, network latency, etc.), and system metrics (e.g., CPU utilization, memory utilization, etc.), as examples. Any technique now known or later developed for determining such metrics may be employed by resource monitors 12.

Management system 14 is again provided, which is operable to receive the metrics Metric 1 through Metric N and evaluate such metrics to detect anomalous behavior of computing system 11. As shown, management system 14 comprises state determination logic 15, in this embodiment, which is operable to receive the metrics and determine one or more "states" 16 of the computing system 11 (or component parts thereof, such as a given application executing thereon). In this example, state determination logic 15 and learning logic 102 each employs an exemplary hierarchical model 301 that represents computing system 11. Such exemplary hierarchical model 301 is shown in detail (e.g., the exemplary layers for modeling distributed computing system 11) within state determination logic 15.

In this example, hierarchical model 301 comprises a plurality of layers, including a base layer that includes corresponding metrics captured for components 1-N of system 11, which are shown as components $302_1$-$302_N$ of the hierarchical model 301. The next layer of hierarchical model 301 includes various URLs that are formed by the underlying components of the base layer, wherein such URLs are shown as URLs $303_1$-$303_4$ of the hierarchical model 301. The next layer of hierarchical model 301 includes two data servers on which the URLs of the preceding layer reside, wherein such data servers are shown as data servers $304_1$-$304_2$ of the hierarchical model 301. The top ("apex") layer of hierarchical model 301 represents the full distributed application that is implemented on computing system 11 (i.e., that is distributed across the two data servers and is implemented by the four URLs of the preceding layers of the hierarchy), wherein such distributed application is shown as distributed application 305 of the hierarchical model 301.

State determination logic 15 determines states 16 of the components of the various hierarchical layers of hierarchical model 301. For instance, such states 16 comprises a state for each of the components 1-N of the base layer of hierarchical model 301, which are shown as states $306_1$-$306_N$. The states 16 also comprise states of the URLs of the next layer of hierarchical model 301, which are shown as URL states $307_1$-$307_4$. States 16 also comprise states of the data servers of the next layer of hierarchical model 301, which are shown as data server states $308_1$-$308_2$. Finally, states 16 also comprises a state of the full distributed application, which is shown as distributed application state 309. As mentioned above each of states 16 may indicate one of a plurality of different states for the corresponding component of computing system 11. As an example, states 16 may be either "0" indicating a normal state for a corresponding component part of computing system 11 or "1" indicating an abnormal state for a corresponding component part of computing system 11. Of course, while two states of "normal" and "abnormal" are described in this example, in certain embodiments any number of different states may be implemented for differentiating between different types of behavior. As one example, in certain embodiments, "0" may indicate a normal state for a corresponding component part of computing system 11, "1" may indicate an abnormally low state for a corresponding component part of computing system 11 (e.g., low CPU utilization, etc.), and "2" may indicate an abnormally high state for a corresponding component part of computing system 11 (e.g. high CPU utilization, etc.).

As discussed further herein, learning logic 102 employs the hierarchical model 301 to determine, based on historical metrics 101, appropriate state determination functions 103 for each of the components in each layer of the model, wherein such state determination functions 103 may be employed by state determination logic 15 for determining states 16. As described further herein, according to certain embodiments of the present invention, the learning logic 102 finds the sub-functions that minimize the description length represented by a given equation (e.g., Equation 1 discussed below) over the historical metric data 101 observed for computing system 11. The state determination logic 15 then finds the particular set of states that will minimize the description length for the current metric values (Metrics 1-N) observed for the system 11 being monitored.

Figure 4:
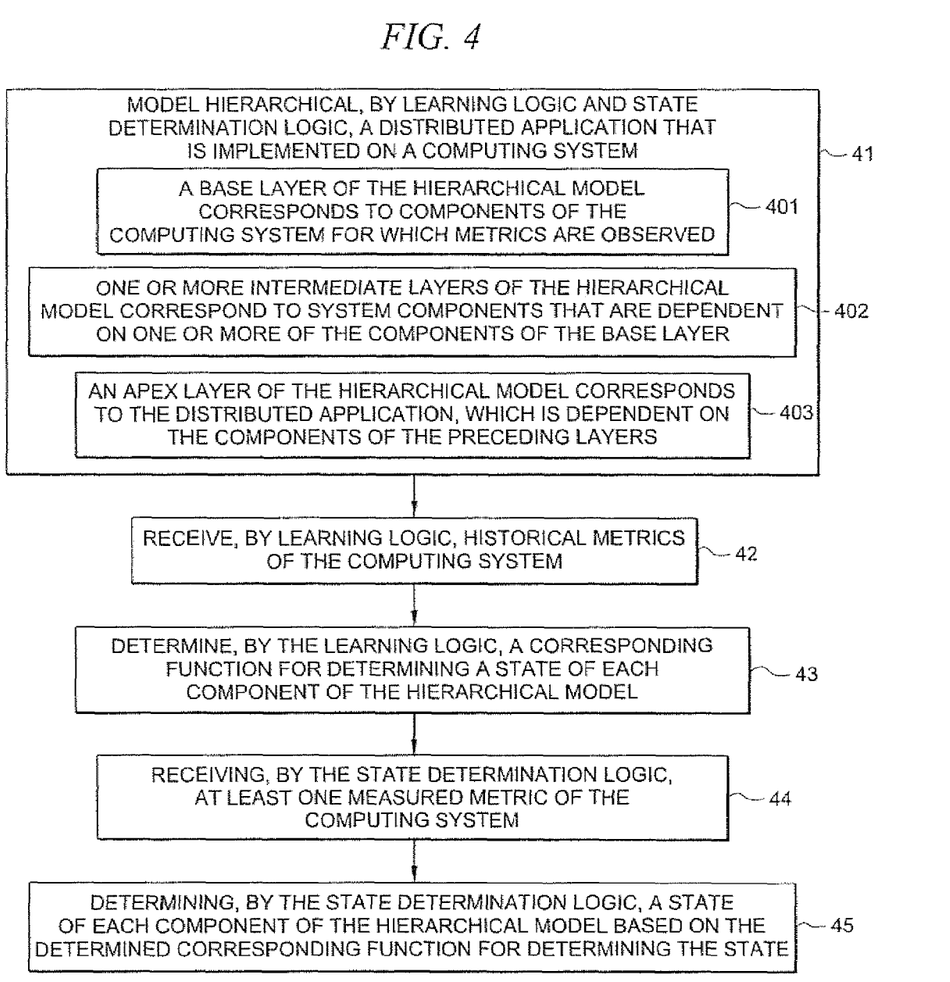
FIG. 4 shows an operational flow diagram of one embodiment of the present invention.

FIG. 4 shows an operational flow diagram according to one embodiment of the present invention. In operational block 41, learning logic 102 and state determination logic 15 models hierarchically a distributed application that is implemented on a computing system 111 (e.g., as with hierarchical model 301 of FIG. 3). In doing so, the model may, in block 401, include a base layer of the hierarchical model that corresponds to components of the computing system 11 for which metrics are observed. Further, the model may, in block 402, include one or more intermediate layers of the hierarchical model that correspond to system components that are dependent on one or more of the components of the base layer. Further still, the model may, in block 403, include an apex layer of the hierarchical model that corresponds to the distributed application, which is dependent on the components of the preceding layers.

In block 42, learning logic 102 receives historical metrics 101 of the computing system 1. In block 43, the learning logic 102 determines a corresponding function 103 for determining a state of each component of the hierarchical model 301. According to certain embodiments of the present invention, the learning logic 102 determines sub-functions that minimize the description length represented by a given equation over the historical metric data 101. For instance, in one embodiment, the learning logic 102 selects forms of sub-functions d and h that are included in a given equation, such as the equation that represents description length described below (i.e., Equation 1), such that the equation is minimized over a set of historical metric values observed for the system, as discussed further herein.

In block 44, the state determination logic 15 receives at least one measured metric (e.g., Metrics 1-N of FIG. 3) of the computing system 11, and in block 45 the state determination logic 15 determines a state 16 of each component of the hierarchical model 301 based on the determined corresponding function 103 for determining the state. That is, a state indicating a behavioral state of the corresponding component, such as normal or abnormal, for each component of each layer of the hierarchical model (which is derived based on the received metrics). Thus, according to certain embodiments, the state determination logic 15 determines the particular set of states that will minimize the description length for the current metric values observed for the system 11 being monitored.

According to one embodiment of the present invention, a computing system being monitored comprises a distributed computing system, which is modeled as having K layers, each of which has $n_k$ components, where k is a positive integer less than or equal to K. Each component in the model has a state associated with it, and the state can take one of two values: 0 (for normal) or 1 (for abnormal). Thus, for example, such model 301 (e.g., algorithm) may be employed by learning logic 102 and state determination logic 15 as shown in FIG. 3.

The inputs to the management algorithm (e.g., of state determination logic 15 of FIG. 1) according to this exemplary embodiment are the observed metric values 13 associated with the states of the components in a first layer of the hierarchy (i.e., layer 1). As mentioned above, the metrics may include, but are not limited to, performance metrics (e.g., average server time, server time distribution histogram, page file size, number of slow pages, number of transactions), network metrics (e.g., network throughput, network latency) and system metrics (e.g., CPU utilization, memory utilization).

The outputs of the exemplary management system (e.g., state determination logic 15 of FIG. 1) are the states 16 of each component of each layer. Each state can take one of two values, 0 (for normal) or 1 (for abnormal), in this exemplary embodiment. According to this exemplary embodiment, the computing system 11 is modeled as a hierarchy of different layers. The layer structure of such hierarchy may be implemented as follows:

Layer 1: The number, $n_1$, of components in layer 1 (or the "base" layer) is equal to the number of metrics. The state of the component i of layer 1 is the state of the metric i.

Layer K: The number, $n_k$, of components in layer K (or the "top" or "apex" layer of the hierarchy) is equal to one. The state of the component in layer K is the state of the distributed service itself (e.g., the state of a distributed computing system 11 or the state of a given distributed application that is being monitored/managed).

Intermediate Layers: The number, $n_k$, of components in layer k (where 1<k<K) is equal to the number of components in layer k. Each component in layer k (where I<k<K) is connected to (i) one or more components in layer k−1; and (ii) one and only one component in layer k+1.

The connections imply the dependencies between the different layers and components, as mathematically modeled herein below (see equation (1) below).

Figure 5:
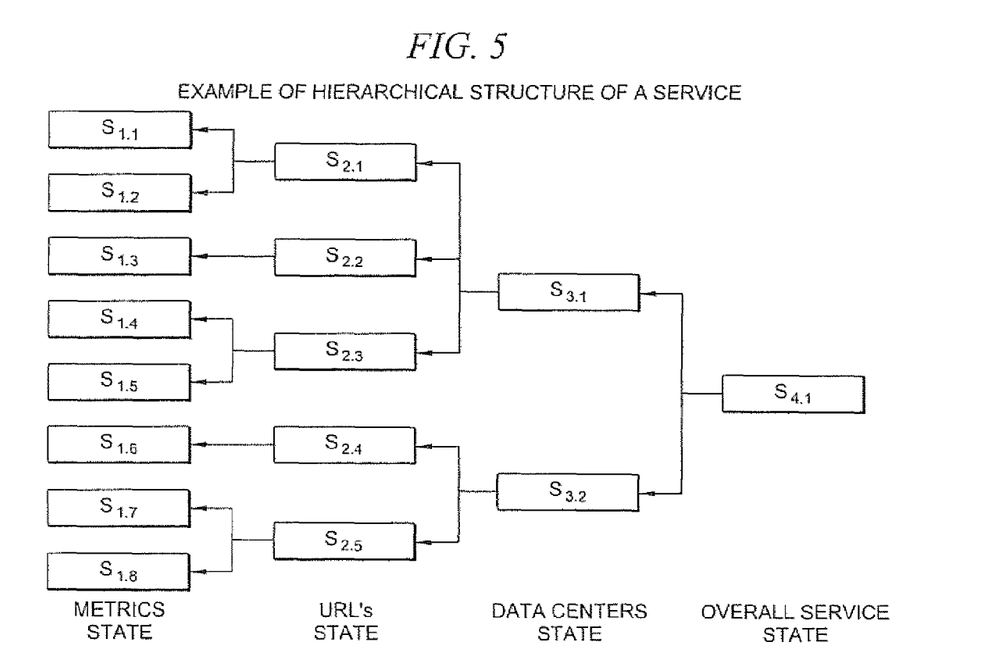
FIG. 5 shows an exemplary hierarchical model of a distributed application that may be employed according to one embodiment of the present invention.

FIG. 5 is a diagram of an exemplary distributed application modeled hierarchically according to one embodiment of the present invention as having the following four layers:

(i) states of the metrics in layer 1, (ii) states of the URLs in layer 2, (iii) states of the data centers in layer 3, and (iv) state of the distributed service itself in layer 4.

Now, the mathematical model (e.g., hierarchical model 301) and state decisions according to one embodiment of the present invention are discussed further. In general terms: the principle of minimum description length (MDL) is a theory that has its roots in information theory. According to the MDL principle, the best decision is the one that leads to the shortest description of the data, where the description length of the data is measured in terms of the information-theoretic entropy. The description length of a distributed service is the sum of the description length of the metrics and the description length of the states of the components. According to this exemplary embodiment of the present invention, the metrics are observed/collected, and the goal becomes to find the states. From the MDL principle, the best set of states is the one that minimizes the description length. Based on information theory, it can be shown that the description length of a distributed service is given by Equation 1 described below, assuming a hierarchical service structure. The goal of the learning logic 102 is then to select of h and d such that the description length (e.g., Equation 1) is minimized over the set of historical metric values 101. The goal of the state determination logic 15 is to select the arguments of h and d (the arguments are the states) that will minimize the description length (e.g., Equation 1) for the current metric values (e.g., Metrics 1-N of FIG. 3).

According to this exemplary embodiment, each component, i, in layer 1 is associated with a function of the form $d_i(m_i,s)$, where $m_i$ is the observed value of metric i and s is a state variable. The state variable s can take one of the two values: 0 or 1, in this exemplary embodiment. The function $d_i$ is a cost function, whose value is high when the metric shows abnormal behavior and is low when the metric shows normal behavior. The function $d_i$ is estimated in the learning stage described further below. For instance, the function $d_i$ may determine whether an observed metric value is normal or abnormal for the computing system being monitored (e.g., based on historical performance of the computing system).

Each component, i, in each layer k is associated with a function of the form $h_{k,i}(s,t)$, where s is the state of the component and t is the state of the component to which it is connected in layer k+1. The state variables s and t can take one of two values: 0 or 1, in this exemplary embodiment. For layer K, $h_{K,i}(s,t) = h_{K,i}(S)$ since there is no next layer in the hierarchy. The functions $h_{k,i}$ are estimated in the learning stage described further below.

Denoting the state of component i of layer k by $S_{k,i}$, the outputs (i.e, the states) of the algorithm are the set of states that minimize the description length (DL):

$$DL = \sum_{k=1}^{K} \sum_{i=1}^{n_k} h_{k,i}(s_k, s_{k+1}) + \sum_{j=1}^{n_1} d_j(m_j, s_1) \quad (1)$$

Learning of the model, which may be employed by model learning logic 102, according to one embodiment of the present invention is now described. First, the representation of $d_i$ is addressed. The functions of $d_i$ can be represented as data compression cost functions, probability distribution functions, entropy functions, or any other cost function. Estimation of $d_i$ depends on the choice of the cost function. For example, if a probability distribution is chosen, maximum likelihood estimation can be used.

The operation of learning logic 102 according to this exemplary embodiment is now discussed in further detail. According to this embodiment each of the terms h and d of Equation (1) is a sub-function with some parameters. The forms of these sub-functions are determined by information-theoretic principles based on the hierarchical structure, and their parameters are learned by the learning logic 102. The learning logic 102 uses the statistics obtained from the historical metric measurements 101 to learn the parameters of h and d, provided the system administrator's desired alarm ratio is ensured. The learning logic 102 selects these sub-functions so as to minimize the description length given in Equation 1, ensuring that the system administrator's desired alarm ratio is met. There are many methods one can use to learn these sub-functions so as to minimize Equation 1; for instance, iterative techniques provide one such way to learn them. An example of such an iterative technique that may be employed in certain embodiments is as follows:

Once the function $d_i$'s are chosen and estimated, an iterative algorithm may be used to estimate $h_{k,i}$'s. An initial set of values for the $h_{k,i}$'s is chosen, and the following iterations are used to update these values. Each iteration includes the following two updates:

i. given the estimates of the $h_{k,i}$'s from the previous iteration, predict the states of all components by minimizing DL (Eq. 1 above);

ii. given the predicted states of all components from the previous iteration, update the values of the $h_{k,i}$'s by sample averages.

The algorithm stops when the value of DL (Eq. 1 above) from one iteration to the next falls below a pre-defined threshold.

An exemplary algorithm that may be employed for predicting the set of states of all components that minimizes DL by using such an iterative technique according to one embodiment of the present invention is as provided in the following pseudocode:

Given variables:
$n_k$: number of components in layer k.
K: number of layers.
Other variables:
$cost_{k,i}(s)$ cost of component i of layer k if its state is S.
$state_{k,i}(s)$: state of component i of layer k.
$store_{k,j}(s)$: state of component j of layer k if the optimum state of the component to which it is attached in layer k+1 is S.
$temp_0$ and $temp_1$: temporary variables.

Algorithm predict states:

```
\\Initialization
Set all cost_{i,j} to zero
\\ compute costs of observed metrics
for i=1 to n_1{
    cost_{1,i}(0)=d_i(m_i,0)
    cost_{1,i}(1)=d_i(m_i,1)
}
\\ Iteratively compute DL with minimum costs at each level of hierarchy
for k=2 to K{
    for i=1 to n_k{
        for j=1 to n_{k-1}{
            if component i in layer k is the parent of component j in layer k-1
            do{
                for t=0 to 1{
                    temp_0=h_{k-1,j}(0,t)+cost_{k-1,j}(0)
                    temp_1=h_{k-1,j}(1,t)+cost_{k-1,j}(1)
                    \\ choose minimum of two options at level k
                    cost_{k,i}(t)=min(temp_0,temp_1)
```

-continued

```
    \\ store the state choice leading to the above minimum cost
    if (temp₀<temp₁)
        store_{k,j}(t)=0
    else
        store_{k,j}(t)=1
    }
   }
  }
 }
}
\\ Decide the state of layer K (top single node)
if cost_{K,1}(0) < cost_{K,1}(1)
    state_{K,1}=0
else
    state_{K,1}=1
\\ Determine actual states of all lower layers components by traversing
"store":
for k=K-1 to 1{
    for i=1:n_k{
        for j=1:n_{k+1}{
            if component i in layer k is a child of component j in layer k+1
                state_{k,i}=store_{k,i}(state_{k+1,j})
        }
    }
}
Return state
```

Operation of state determination logic 15 according to this exemplary embodiment of the present invention is now further described. Once the sub-functions h and d are learned, the state determination logic 15 finds the set of states that minimizes Equation (1) for the metric values of the current time instance. It should be noted that in this example the sub-functions h and d have two types of arguments: 1) observed metric values, and 2) states. Thus, state determination logic 15 determines the states that will minimize Equation 1 when presented with a set of metric values (e.g., the current Metrics 1-N of FIG. 3 that are observed for system 11). There are many methods one can use for this minimization to find the states, in accordance with embodiments of the present invention. For example, one such method is message passing. The hierarchical structure 301 of the service determines the routes through which messages ace sent to and received by the metrics. For instance, in FIG. 5, first each metric passes a message to its parent URL so that each URL forms a message. Then, each URL passes its message to its parent data center, so that each data center forms a message. Finally, each data center passes its message to the overall service layer, which forms its message. Then, the messages are passed back to the metrics through the same route. Each message is a function of one argument, taking two values: 0 and 1, in this exemplary embodiment. In this example, the algorithm employed by state determination logic 15 selects the argument value (0 or 1) that minimizes the messages in their routes back.

In view of the above, according to certain embodiments of the present invention, learning logic 102 is provided which is operable to determine the sub-functions that minimize the description length over the historical metric data of a computing system being monitored, ensuring the alarm ratio criterion is met. State determination logic is also provided which is operable to determine the particular set of states that will minimize the description length for the current metric values observed for the computing system being monitored. Both the learning logic 102 and state determination logic 15 may employ a hierarchical structure of the system for efficiently arriving at their respective determinations.

Further, it should be recognized that the function used for minimization does not have to be the description length, such as the exemplary Equation 1 discussed above. It can be any function, comprising a plurality of sub-functions, where each sub-function represents the dependency between two of the components linked in the hierarchical structure (it should be noted that each term h and d in Equation 1 above represents a dependency between two linked components). The goal of the learning logic 102 according to certain embodiments is to find the exact forms of these sub-functions, and the goal of the state determination logic 15 according to certain embodiments of the present invention is to find the states that minimize the function composed of these sub-functions over the current metric values. The exemplary techniques described above with Equation 1 provide one way to describe, learn and implement this function and its sub-functions, but other ways may be similarly employed.

When implemented via computer-executable instructions, various elements of embodiments of the present invention are in essence the software code defining the operations of such various elements. The executable instructions or software code may be obtained from a readable medium (e.g. a hard drive media, optical media, EPROM, EEPROM, tape media, cartridge media, flash memory, ROM, memory stick, and/or the like) or communicated via a data signal from a communication medium (e.g., the Internet). In fact, readable media call include any medium that can store or transfer information.

Figure 6:
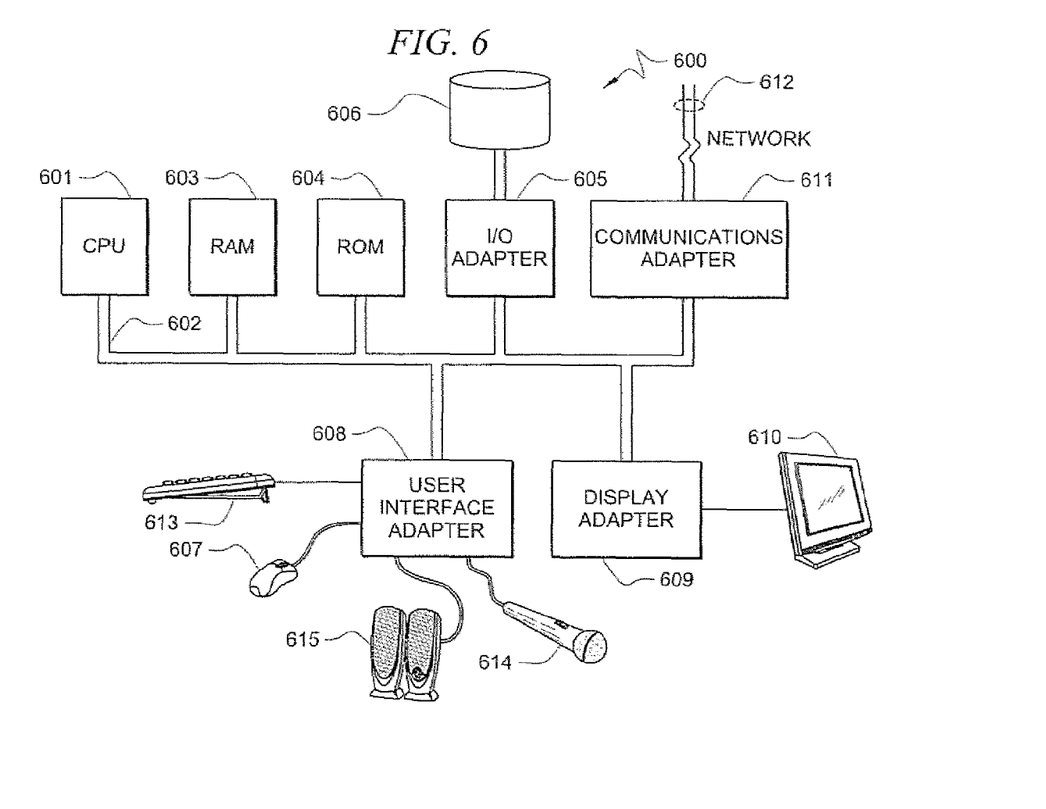
FIG. 6 shows an exemplary system on which certain embodiments of the present invention may be implemented.

FIG. 6 illustrates an exemplary computer system 600 on which various elements of embodiments of the present invention, such as learning logic 102 and/or state determination logic 15, may be implemented according to certain embodiments of the present invention. Central processing unit (CPU) 601 is coupled to system bus 602. CPU 601 may be any general-purpose CPU. The present invention is not restricted by the architecture of CPU 601 (or other components of exemplary system 600) as long as CPU 601 (and other components of system 600) supports the inventive operations as described herein. CPU 601 may execute the various logical instructions according to embodiments of the present invention. For example, CPU 601 may execute machine-level instructions according to the exemplary operational flows described above in conjunction with FIGS. 2 and 4 and/or the exemplary pseudocode provided above.

Computer system 600 also preferably includes random access memory (RAM) 603, which may be SRAM, DRAM, SDRAM, or the like. Computer system 600 preferably includes read-only memory (ROM) 604 which may be PROM, EPROM, EEPROM, or the like. RAM 603 and ROM 604 hold user and system data and programs, as is well known in the art.

Computer system 600 also preferably includes input/output (I/O) adapter 605, communications adapter 611, user interface adapter 608, and display adapter 609. I/O adapter 605, user interface adapter 608, and/or communications adapter 611 may, in certain embodiments, enable a user to interact with computer system 600 in order to input information.

I/O adapter 605 preferably connects to storage device(s) 606, such as one or more of hard drive, compact disc (CD) drive, floppy disk drive, tape drive, etc. to computer system 600. The storage devices may be utilized when RAM 603 is insufficient for the memory requirements associated with storing data for operations of the learning logic 102 and/or state determination logic 15. Communications adapter 611 is preferably adapted to couple computer system 600 to network 612, which may enable information to be input to and/or output from system 600 via such network 612 (e.g., the Internet or other wide-area network, a local-area network, a public or private switched telephony network, a wireless network, any combination of the foregoing). User interface adapter 608 couples user input devices, such as keyboard 613, pointing device 607, and microphone 614 and/or output devices, such as speaker(s) 615 to computer system 600. Display adapter 609 is driven by CPU 601 to control the display on display device 610 to, for example, display information, such as alarms that may be triggered based on determined states, according to certain embodiments of the present invention.

It shall be appreciated that the present invention is not limited to the architecture of system 600. For example, any suitable processor-based device may be utilized for implementing learning logic 102 and/or state determination logic 15, including without limitation personal computers, laptop computers, computer workstations, and multi-processor servers. Moreover, embodiments of the present invention may be implemented on application specific integrated circuits (ASICs) or very large scale integrated (VLSI) circuits. In fact, persons of ordinary skill in the art may utilize any number of suitable structures capable of executing logical operations according to the embodiments of the present invention.

What is claimed is:

1. A method comprising:

receiving, by learning logic, historical metrics of a computing system being monitored;

determining, by the learning logic, from the received historical metrics, forms of sub-functions that are included in an equation, wherein each sub-function represents a dependency between two components linked in a hierarchical structure representing the computing system being monitored;

receiving, by state determination logic, metric values of the computing system being monitored;

determining, by the state determination logic, states that minimize the equation composed of the sub-functions over the received metric values; and detecting anomalous behavior of the computing system based on the determined states.

2. The method of claim 1 comprising:

determining, by the learning logic, said forms of said sub-functions that minimize the description length of said equation over the received historical metrics.

3. The method of claim 2 comprising:

selecting, by the learning logic, sub-functions d and h such that the description length represented by said equation is minimized over the received historical metrics;

wherein sub-function $d_i$ is a cost function associated with a component i in a base layer of the hierarchical structure representing the computing system being monitored; and wherein sub-function $h_{k,i}$ is a function associated with each component i of each intermediate layer k of the hierarchical structure representing the computing system, where said function $h_{k,i}$ is based on the state of the corresponding component i and the state of the component to which said corresponding component i is connected in a successive layer k+1 of the hierarchical structure.

4. The method of claim 3 further comprising:

selecting, by the state determination logic, arguments of sub-functions h and d that minimize said description length for the received metric values.

5. The method of claim 1 wherein said equation comprises:

$$DL = \sum_{k=1}^{K} \sum_{i=1}^{n_k} h_{k,i}(s_k, s_{k+1}) + \sum_{j=1}^{n_1} d_j(m_j, s_1);$$

wherein DL is description length;

wherein the hierarchical structure comprises K layers, with a number, $n_1$, of components in layer 1 that is equal to a number of metrics observed for the computing system; and a number, $n_K$, of components in layer K is equal to one; and a number, $n_k$, of components in layer k, where 1<k<K, is equal to the number of components in layer k;

wherein each component, i, in layer 1 is associated with a function of form $d_i(m_i,s)$, where $m_i$ is an observed value of metric i and s is a state variable; and wherein each component, i, in each layer k is associated with a function of form $h_{k,i}(s,t)$, where s is a state of the component and t is a state of the component to which it is connected in layer k+1.

6. The method of claim 5 wherein each component in layer k, where 1<k<K, is connected to:

(i) one or more components in layer k−1; and (ii) one and only one component in layer k+1.

7. The method of claim 5 wherein function $d_i$ is a cost function whose value is high when a corresponding metric indicates abnormal behavior and is low when the corresponding metric indicates normal behavior.

8. The method of claim 1 comprising:

determining, by the state determination logic, said states that minimize a description length for the received metric values.

9. A method comprising:

receiving, by learning logic, historical metrics of a computing system being monitored;

determining, by the learning logic, a corresponding function for determining a state of at least one component of the computing system, wherein the learning logic uses a hierarchical model of the computing system to determine the corresponding function;

receiving, by state determination logic, at least one measured metric of the computing system being monitored; and determining, by the state determination logic, a state of the at least one component of the computing system based on the determined corresponding function for determining the state.

10. A method comprising:

receiving, by learning logic, historical metrics of a computing system being monitored;

determining, by the learning logic, a corresponding function for determining a state of at least one component of the computing system;

receiving, by state determination logic, at least one measured metric of the computing system being monitored;

determining, by the state determination logic, a state of the at least one component of the computing system based on the determined corresponding function for determining the state;

wherein said determining said corresponding function comprises:

determining, by said learning logic, forms of sub-functions that are included in a given equation, wherein each sub-function represents a dependency between two components linked in a hierarchical structure representing the computing system.

11. The method of claim 10 wherein said determining said state comprises:

determining, by the state determination logic, said state that minimizes the equation composed of the sub-functions over the received at least one measured metric.

12. The method of claim 11 wherein said equation comprises:

$$DL = \sum_{k=1}^{K} \sum_{i=1}^{n_k} h_{k,i}(s_k, s_{k+1}) + \sum_{j=1}^{n_1} d_j(m_j, s_1);$$

wherein DL is description length;
wherein the hierarchical structure comprises K layers, with a number, $n_1$, of components in layer 1 that is equal to a number of metrics observed for the computing system; and a number, $n_K$, of components in layer K is equal to one; and a number, $n_k$, of components in layer k, where 1<k<K, is equal to the number of components in layer k;
wherein each component, i, in layer 1 is associated with a function of form $d_i(m_i,s)$, where $m_i$ is an observed value of metric i and s is a state variable; and
wherein each component, i, in each layer k is associated with a function of form $h_{k,i}(s,t)$, where s is a state of the component and t is a state of the component to which it is connected in layer k+1.

13. The method of claim 9 further comprising:
detecting anomalous behavior of the computing system based on the determined state.

14. A system comprising:
a hierarchical model representing at least a portion of a computing system;
learning logic operable to receive historical metrics of the computing system, and determine a corresponding function for determining a state of each component of the hierarchical model; and
state determination logic operable to receive at least one measured metric of the computing system, and determine a state of each component of the hierarchical model based on the determined corresponding function for determining the state.

15. The system of claim 14 wherein said corresponding function determined by said learning logic comprises forms of sub-functions that are included in a given equation, wherein each sub-function represents a dependency between two components linked in the hierarchical model.

16. The system of claim 15 wherein the state determination logic is operable to determine said states that minimize the given equation composed of the sub-functions over the received at least one measured metric.

17. The system of claim 16 wherein said given equation comprises:

$$DL = \sum_{k=1}^{K} \sum_{i=1}^{n_k} h_{k,i}(s_k, s_{k+1}) + \sum_{j=1}^{n_1} d_j(m_j, s_1);$$

wherein DL is description length;
wherein the hierarchical model comprises K layers, with a number, $n_1$, of components in layer 1 that is equal to a number of metrics observed for the at least a portion of the computing system; and a number, $n_K$, of components in layer K is equal to one; and a number, $n_k$, of components in layer k, where 1<k<K, is equal to the number of components in layer k;
wherein each component, i, in layer 1 is associated with a function of form $d_i(mi,s)$, where $m_i$, is an observed value of metric i and s is a state variable; and
wherein each component, i, in each layer k is associated with a function of form $h_{k,i}(s,t)$, where S is a state of the component and t is a state of the component to which it is connected in layer k+1.

18. The system of claim 14 wherein said hierarchical model represents a distributed application implemented on the computing system.

19. The system of claim 14 wherein said hierarchical model comprises:
a base layer that corresponds to components of the at least a portion of the computing system for which metrics are observed;
one or more intermediate layers that correspond to system components that are dependent on one or more of the components of the base layer; and
an apex layer that corresponds to the at least a portion of the computing system for which metrics are observed, which is dependent on the components of the preceding layers.

20. The system of claim 14 wherein said learning logic and said state determination logic comprise computer-executable software code stored to computer-readable medium which, when executed by a computer, causes the computer to perform their respective operations.

* * * * *

UNITED STATES PATENT AND TRADEMARK OFFICE
CERTIFICATE OF CORRECTION

PATENT NO.         : 7,577,550 B2                                    Page 1 of 1
APPLICATION NO.    : 11/742534
DATED              : August 18, 2009
INVENTOR(S)        : Mehmet Kivanc Ozonat et al.

It is certified that error appears in the above-identified patent and that said Letters Patent is hereby corrected as shown below:

In column 16, line 18, in Claim 17, delete "$d_i(mi,s)$," and insert -- $d_i(m_i,s)$, --, therefor.

In column 16, line 18, in Claim 17, delete "$m_i$," and insert -- $m_i$ --, therefor.

In column 16, line 21, in Claim 17, delete "S" and insert -- s --, therefor.

Signed and Sealed this

Twenty-seventh Day of April, 2010

David J. Kappos
*Director of the United States Patent and Trademark Office*